Dec. 31, 1968 D. D. RUDIE 3,419,287

FINGERPRINT CLASSIFICATION BY COORDINATE SYSTEM

Filed Dec. 8, 1965 Sheet 1 of 3

INVENTOR.
DONALD D. RUDIE
BY Fulwider, Patton, Rieber Lee, and Utecht
ATTORNEYS

INVENTOR.
DONALD D. RUDIE
BY Fulwider, Patton, Rieber, Lee, and Utecht
ATTORNEYS

INVENTOR.
DONALD D. RUDIE

Zulunder, Patton, Rieber, Lee, and Utecht
ATTORNEYS

United States Patent Office 3,419,287
Patented Dec. 31, 1968

3,419,287
FINGERPRINT CLASSIFICATION BY COORDINATE SYSTEM

Donald D. Rudie, Washington Township, Westwood, N.J., assignor to System Development Corporation, Santa Monica, Calif.

Filed Dec. 8, 1965, Ser. No. 512,397
5 Claims. (Cl. 283—7)

ABSTRACT OF THE DISCLOSURE

A method and system of fingerprint classification which locates one of the core and delta of a fingerprint in a standardized location in a coordinate system and the other in a standardized direction therefrom, determines the coordinates of the minute characteristics of the fingerprint in the coordinate system and records the coordinates of the minute characteristics to uniquely identify the fingerprint. It enables the recording of the characteristics of large numbers of fingerprints by Cartesian or like coordinates in a machine store or file, such as in a computer which may be programmed for rapid search for identity and matching.

The method of fingerprint classification according to the present invention places particular emphasis on the minute characteristics of the fingerprints in addition to their classification as to general pattern type, such as loop, whorl, arch. By this method, each single fingerprint in a file of many millions of fingerprints may be uniquely classified. Ideally the system includes a man-machine relationship in which the man does those things that he is best capable of doing, such as identifying characteristics in the pattern area, while the computer does those things that it is most capable of doing, such as performing arithmetical calculations and searching large files.

Eixsting methods of fingerprint classification do not lend themselves to computerization to produce an effective latent fingerprint system. Primarily this is because under all of the present methods it is possible that many fingerprints will be classified the same. This means that the computer in making a search based on such methods of classification will produce many sets of fingerprints as possibly the correct one to match the print being searched. A manual visual search must then be made of all the identified possibilities. Furthermore, the existing methods of classification involve numerous rules and many individual judgments which widen the searching tolerances which further complicates any computer based system because an even larger number of fingerprints will be identified as possible matches for the one being searched.

The method according to the present invention provides for unique classification of a single fingerprint in a file of many millions of prints. The human tasks in the operation are easy and simple and require little special training and are not liable to error. When the classification information is stored and searched in a computer, the time required to compare a search print with the prints in the computer file is quite small and results in most cases in the identification of a single print matching the search print.

In one preferred implementation of the system, a computer will store the location of each of the characteristics in the fingerprint pattern area in a reference or base file. Each unit in the file contains the locations of the characteristics in one single fingerprint, together with additional information identifying the individual general pattern type, hand and finger, etc.

A convenient reference system for identifying the location of the characteristics in classifying according to the present invention uses Cartesian coordinates in a standard $x—y$ coordinate system although it is obvious that other coordinate systems, such as polar coordinates, may be used. The fingerprints will be located in the same way in the coordiante system, one convenient arrangement being to locate the core of the fingerprint pattern at the origin of a Cartesian coordinate system with the delta falling on an axis of the system, herein selected for purposes of illustration and description, the $-x$ axis. One reason for choosing this arrangement is that the actual position of the delta is not as important to the coordinate system as its direction from the core and while many latent prints have the delta missing, a fingerprint expert is usually able to indicate the direction of the delta from the core. The location of each characteristic in the fingerprint pattern is then the $x$ and $y$ coordinates of the characteristic with respect to this coordinate system.

It is therefore an object of the present invention to provide a new and improved method and system for classifying fingerprints.

Another object of this invention is the provision of a new method and system of fingerprint classification which will uniquely classify fingerprints by their minute characteristics so that each print in a file of many millions of prints is uniquely classified.

A further object of this invention is the provision of a new method and system of fingerprint classification which lends itself readily to computerization to provide a reference file of a large number of prints which may be searched for print comparison in a short time.

A still further object of this invention is a new and improved system and method of fingerprint classification employing a machine-man relationship in which the human tasks are easy, simple, and not prone to error while the computer performs various calculations, stores a base file of a very large number of latent fingerprint classifications, and searches the base or reference files for search print identification in a short time to provide substantially a unique identification of a single matching print.

Yet another object of the present invention is the provision of a new method and system of fingerprint classification using both the general and minute characteristics of fingerprint patterns with the most emphasis being placed on the minute characteristics whose locations are specified in terms of a reference coordinate system.

Another object of this invention is the provision of a new method and system of fingerprint classification in accordance with the immediately preceding object in which the reference system uses Cartesian coordinates and places the core of the fingerprint pattern at the origin of the coordinate system and the delta of the pattern on an axis of the system.

These and other objects and features of the invention will be apparent to those skilled in the art from the following specification and the appended drawings in which.

In classifying fingerprints according to the present invention, it is convenient to enlarge the print a predetermined amount, for example, between 5 and 10 diameters. Such enlargements can usually be made without distorting the print sufficiently to enter undesirable errors in the locations of the characteristic points.

The operation will be facilitated if the search print is enlarged the same predetermined amount as were the prints on file, although a different enlargement can be easily compensated for, either by using a different size grid or by conversion of the coordinates within the computer program to the standard. The photographing of a standard scale alongside the latent print will facilitate the determination, the amount of change during the photographic process.

Figure 1:
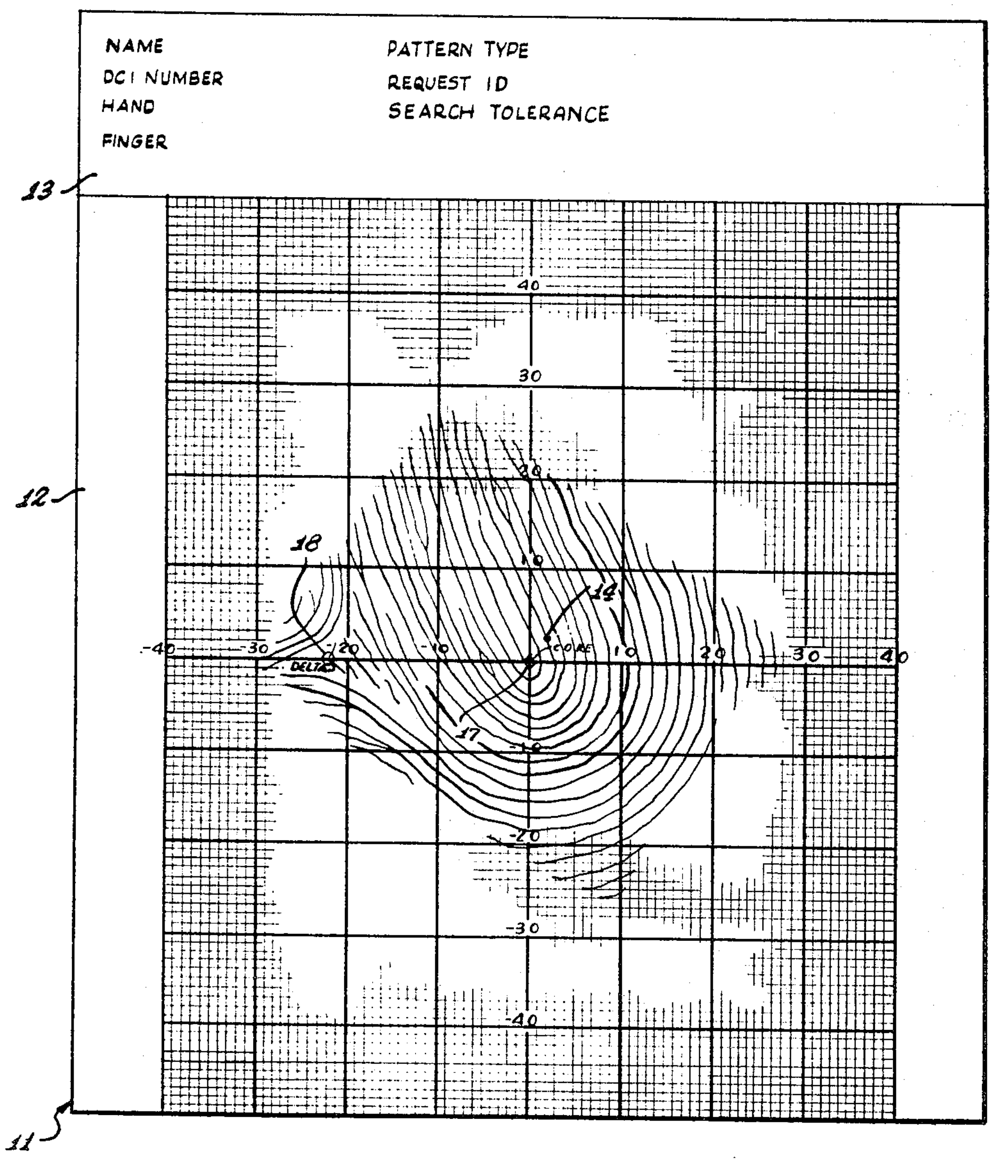
FIGURE 1 illustrates a method of classifying a fingerprint pattern according to the present invention by directly manually determining the location of the characteristics in a Cartesian coordinate system.

In the manual method of determining the location of the characteristics in the fingerprint pattern with respect to the above-described Cartesian coordinate system, the classifier, after enlargement of the print, overlays it with a transparent sheet having the selected coordinate grid system thereon so that the origin of the grid lies on the core of the print and a reference axis falls on the delta. FIGURE 1 illustrates such a system in which the fingerprint has been printed on a form sheet 11 having a substantially square major body portion 12 upon which the fingerprint pattern is printed and a header portion 13. The header portion of the form will contain such information about the fingerprint as may be selected, for example, the person's name, the fingerprint pattern type, and if it is a search request, the request number and search tolerances, and any other information which is desired to record.

The classifier can now use standard key punch cards to enter the location of the characteristics of the fingerprint pattern into a computer. For example, in FIGURE 1 it is seen that there is a characteristic located at (2, 2) where the first number gives the $x$ coordinate and the second the $y$ coordinate of the grid system. This particular characteristic is indicated by the numeral 14. In similar fashion, the classifier can locate all of the characteristics of the fingerprint pattern and enter them into the computer. In this classification system it should be noted that no distinction is made between characteristics. For example, between a bifurcation and a ridge ending. Under this method the classifier therefore avoids possible problems where an imperfect printing may give an erroneous indication of the nature of the characteristic.

In addition to storing the coordinates of the fingerprint pattern characteristics thus given it, the computer will also desirably be programmed to compute and record the distance or range of each characteristic from both the core and delta according to the following formulas:

$$r_{c_i}=[(y_c-y_i)^2+(x_c-x_i)^2]^{1/2}$$

and $$r_{d_i}=[(y_d-y_i)^2+(x_d-x_i)^2]^{1/2}$$

where $r_{c_i}$ and $r_{d_i}$ are the range of the $i$th characteristic from the core and delta, respectively, $y_c$ and $y_d$ are the $y$ coordinates of the core and delta, $x_c$ and $x_d$ are the $x$ coordinates of the core and delta and $y_i$ and $x_i$ are the $y$ and $x$ coordinates of the $i$th characteristic of the fingerprint pattern.

The computer can obviously be very simply programmed to perform the above range or distance calculations in accordance with standard programming practices and will now have in store in one unit location both the coordinates of the various characteristics and their distances from both the core and the delta.

Figure 2:
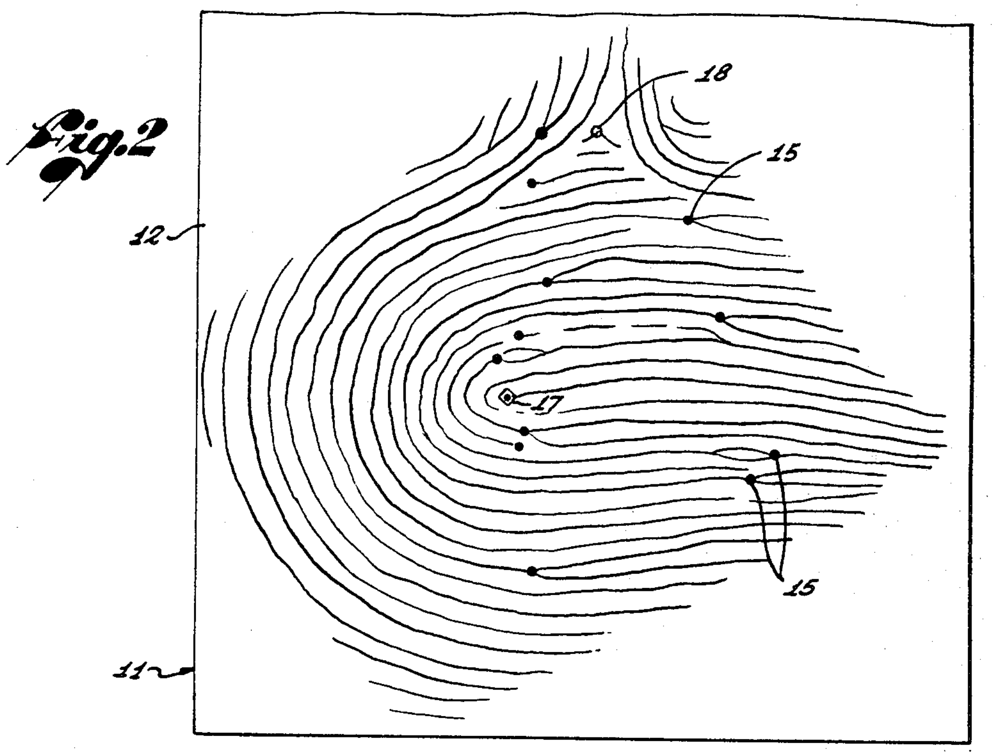
FIGURE 2 illustrates a step in a semi-automatic method of locating the characteristics in a coordinate system with the fingerprint image projected on a special form.

The semi-automatic method of locating characteristics in the fingerprint pattern which will now be described is a more desirable system. This is fast, accurate and easy to use and requires little special training. This semi-automatic method approaches the ideal man-machine relationship where the man is still an indispensable part of the operation to supply the computer with the necessary information. The characteristics of the fingerprint pattern in this operating method are located as follows:

Instead of printing the fingerprint pattern on the form 11 as in FIGURE 1, the classifier places the fingerprint into a projector which projects an enlarged image of the fingerprint pattern onto the special form 11 as shown in FIGURE 2. The classifier marks the locations of the core, delta and of the characteristics on this form, the characteristics by means of heavy black dots 15 in any marking medium, an ordinary writing pencil sufficing, again making no distinction between different natures of the characteristics. He locates the positions of the core and delta uniquely, in this case a circle for the delta and a period in a diamond for the core. The fingerprint pattern may contain as many as 30–50 distinguishable characteristics, only a few of which have been identified in FIGURE 2 with the heavy dots 15. Ordinarily the classifier will mark on the form the locations of all characteristics which he can distinguish.

Figure 3:
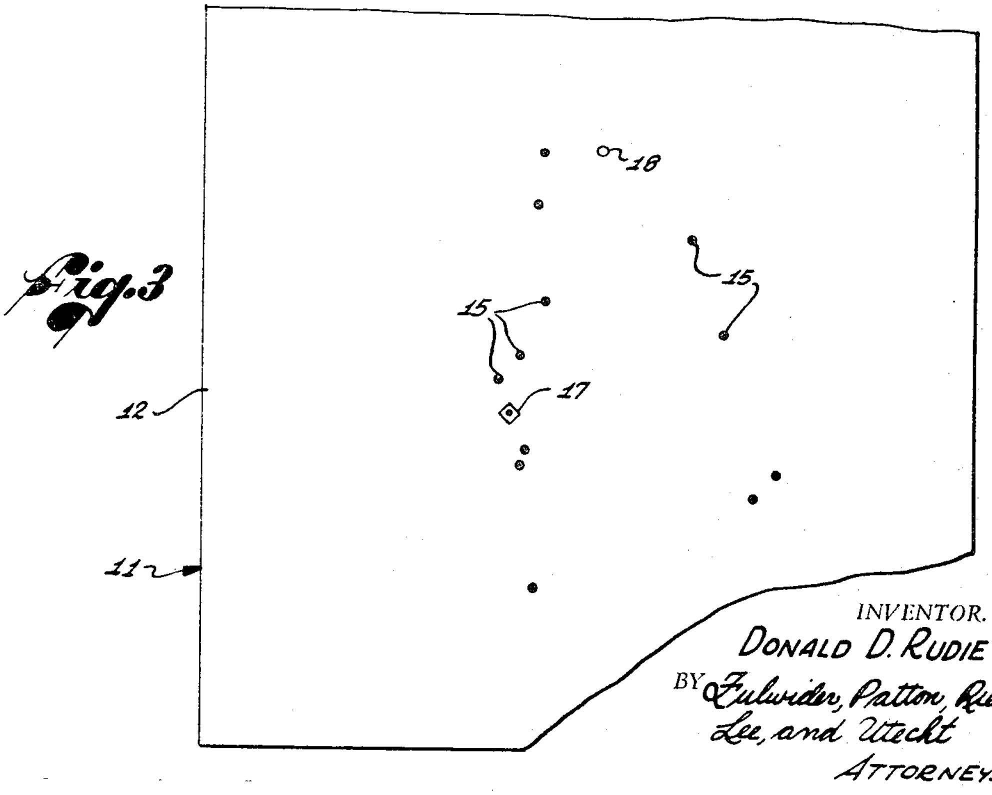
FIGURE 3 is a view like FIGURE 2 but with the image removed.

The projected image of the fingerprint pattern is then removed from the form, leaving thereon an arrangement such as shown in FIGURE 3 with the core and delta of the fingerprint pattern uniquely identified and the characteristics identified by the heavy black dots. The fingerprint of FIGURE 2 may be a fingerprint which is to be added to the base file within the computer, a latent fingerprint taken from the scene of a crime, or an arrest print, the latter two being identified herein as "search" prints which the computer will compare with the fingerprints in the base files to find a match with the crime-scene or arrest prints.

The classifier now inserts the form of FIGURE 3 into a scanner device which will "read" the information contained on the form and send it to the computer. Several forms of such scanners are presently available in the form of optical readers, graphic input tablets and the like, and will hereinafter be referred to generically as scanners.

Figure 4:
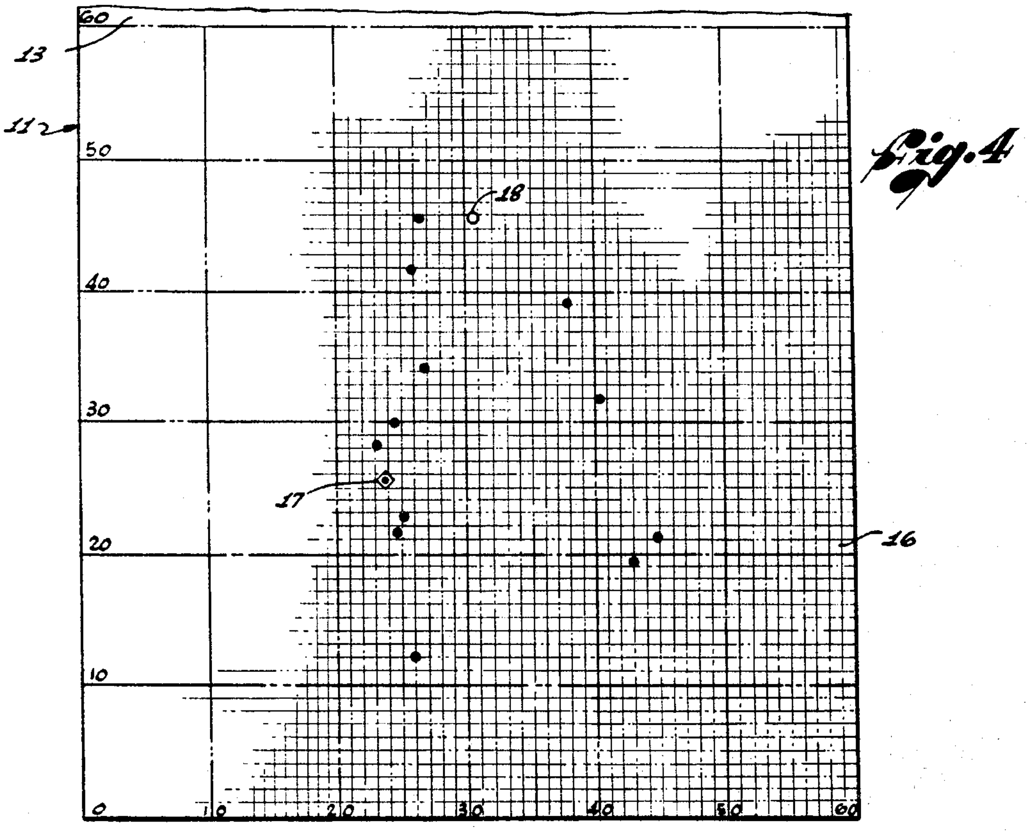
FIGURE 4 is a view similar to FIGURES 2 and 3 but showing a grid system superimposed on the characteristics of the fingerprint pattern.

The scanner considers the square 12 on the form 11 to be one quadrant of a Cartesian coordinate system, as indicated by the imaginary grid 16 of FIGURE 4, this grid not being printed on the form but forming a part of the scanner's internal system, the scanner seeing the form as it appears in FIGURE 3. The scanner now identifies the positions of the core, delta and characteristics in terms of their coordinate location on its own coordinate system 16 wherein the core and delta lie in no predetermined relation with respect to the origin or axes of the scanner grid system. The scanner feeds these locations into the computer in terms of their $x$ and $y$ coordinates on its own coordinate system 16 wherein, in the example shown in FIGURE 4, the core is located at coordinates (24, 26) and the delta at (31, 46), the first number being the $x$ coordinate and the second the $y$ coordinate of the scanner system's coordinate quadrant 16 of FIGURE 4. The locations of the characteristics are likewise read by the scanner in terms of their coordinates on the grid 16 and are likewise fed into the computer. The computer will therefore receive the locations of the core, delta and characteristics of the fingerprint of FIGURE 2 with respect to the Cartesian coordinate system quadrant 16 of the scanner system.

Figure 5:
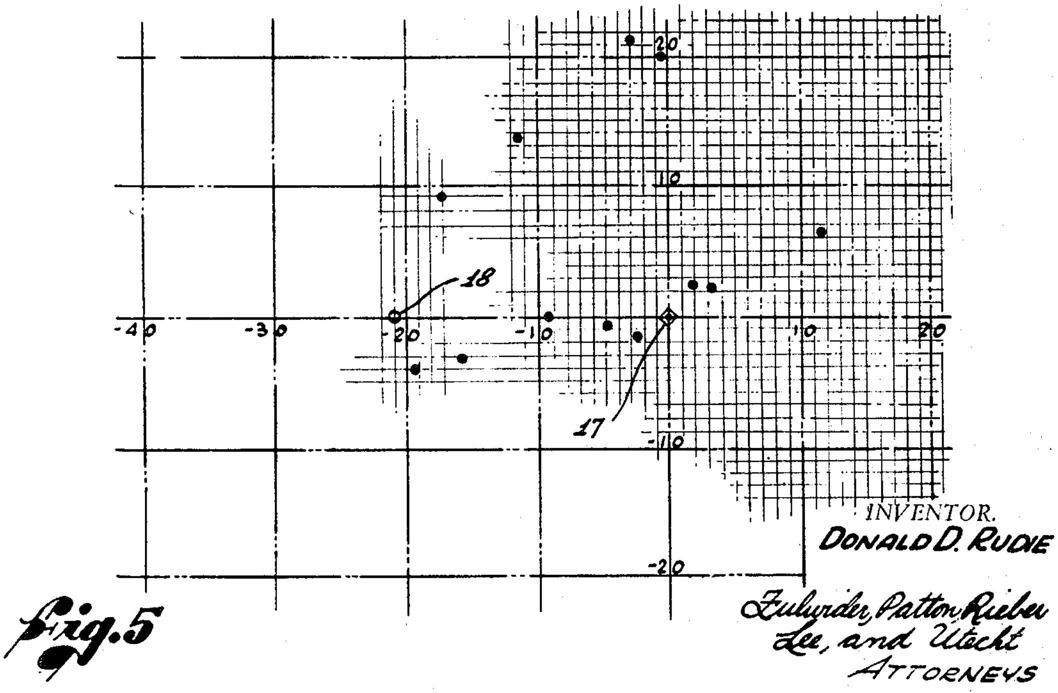
FIGURE 5 is a view showing the fingerprint pattern with the characteristic points now identified on a Cartesian coordinate grid with the core of the fingerprint pattern at the origin and the delta on the $-x$ axis of the grid.

By standard programming techniques the main computer will now transfer the information it has received as to the location of the core, delta and characteristics to a new coordinate system which has been selected for the base file, in the example shown in FIGURE 5, a Cartesian coordinate system which has its origin at the core of the fingerprint and its $-x$ axis falling on the delta of the pattern. The computer determines the $x-y$ coordinates of the points of the fingerprint pattern in the new coordinate system very quickly and places the results in the unit location for that fingerprint if it is a base file print. These new coordinates are determined by the following sets of formulas in which the arithmetic operations can be carried out by the computer in small fractions of a second when properly programmed by standard programming techniques.

Thus, where $x'_i$, $y'_i$ are coordinates of the $i^{th}$ characteristics in the fingeprint pattern with respect to the new coordinate system of FIGURE 5, the transfer to the new system uses the formulas:

$$x'_i=(-1)^j(-1)^k\frac{m(y_i-y_c)-(x_c-x_i)}{1+m^2}$$

$$y'_i=(-1)^j(-1)^k\frac{m(x_c-x_i)+(y_i-y_c)}{1+m^2}$$

where:

$x_i$, $y_i$ are the coordinates of the $i^{th}$ characteristic with respect to the coordinate system 16 of the scanner.

$x_c$, $y_c$ are the coordinates of the core with respect to the coordinate system 16 of the scanner.

$x_d$, $y_d$ are the coordinates of the delta with respect to the coordinate grid 16 of the scanner.

$$m=\frac{y_c-y_d}{x_c-x_d}$$

which is the slope of a line through the core and delta with respect to the coordinate system 16 of the scanner.

$j$=0—if the slope is positive; 1—if the slope is negative.

$k$=0—if the sign of the difference $y_c-y_d$ is positive·
1—if the sign of the difference $y_c-y_d$ is negative The above formulas hold for all cases except where the slope $m$ is zero or infinite, that is, when $y_c-y_d=0$ or $x_c-x_d=0$. In these situations the following simplified formulas will hold where:

$$x'_i=r(x_i-x_c)$$
$$y'_i=s(y_i-y_c)$$

in which if $m$=0, both $r$ and $s$ have values +1 when the difference $x_c-x_d$ is positive and both have values −1 when the difference $x_c-x_d$ is negative. If $m$ has an infinite slope then $r$ and $s$ both have the value +1 except for the situations indicated in the table below:

| Sign of the difference— | | | Value of— | |
|---|---|---|---|---|
| $y_c-y_d$ | $x_i-x_c$ | $y_i-y_c$ | r | s |
| − | + | + | −1 | +1 |
| − | + | − | +1 | −1 |
| − | − | − | −1 | +1 |
| − | − | + | +1 | −1 |
| + | + | + | +1 | −1 |
| + | + | − | −1 | +1 |
| + | − | − | +1 | −1 |
| + | − | + | −1 | +1 |

In addition to making the transfer from the scanner coordinate system 16 of FIGURE 4 to the computer base coordinate system of FIGURE 5, the computer will be programmed by standard techniques to again determine the range (distance) of each characteristic from both the core and delta in accordance with the formulas previously given in the description of the manual classification method of FIGURE 1.

All the above calculations of determining the new $x$ and $y$ coordinates of the characteristics in the computer base coordinate system and the range of each characteristic from both the core and delta will ordinarily be made for all fingerprints that are in the base file since these prints will ordinarily be complete. It may not be possible to make all the calculations in a latent fingerprint search, for instance, where the delta of the print is missing. In such a case, the computer cannot compute the $x$ and $y$ coordinates of the delta nor the range of the characteristics from the delta but can compute the range of each of the characteristics in the latent print from the core. In the case where even the direction of the delta cannot be determined from the latent print, the computer also cannot compute the $x$ and $y$ coordinates of the characteristics but can still compute the range of each of the characteristics from the core and use only this information to search the base file, rather than on the $x$ and $y$ coordinates. In this way the computer has the flexibility of being able to enter and search the reference files in several different ways, making it possible to make a computer search on practically all latent fingerprints. This is again implemented by computer programming according to standard programming techniques and the particular program used forms no part of this invention which is directed to a method and system of classifying the points of a fingerprint pattern in a coordinate system, rather than to a computer program.

It will be seen that the determination of the $x$ and $y$ coordinates of the points of the fingerprint pattern (core, delta and characteristics) with respect to the coordinate system of the base file does not depend on the orientation of the projected fingerprint pattern on the form 11, as in FIGURE 2. Thus the classifier need not move or shift the fingerprint or the form to line up reference points with any guidelines before he indicates the locations of the points of the fingerprint pattern. This cuts the required time and improves the accurcay of the determination.

Special situations can arise which will require special attention but from the viewpoint of the classifier there is very little difference between the normal situation and the special ones and the computer can be programmed by standard techniques to automatically take appropriate action when required. Again, the specific computer program used forms no part of the invention.

Some fingerprints of the general whorl pattern may have more than one core or more than one delta or both. In these situations, the classifier performs normally as in FIGURE 2 except that he will identify more than one core or delta, as the case may be, and indicate in the header 13 of the form the fact that the pattern has multiple cores or deltas. The computer is desirably programmed to build multiple sets of independent coordinates for the characteristics, one set for each different coordinate system that can be formed from the multiple focal points, for example, if the fingerprint pattern contains one core and two deltas, then one set of coordinates for the characteristics will be formed for the coordinate system with origin at the core and the $-x$ axis on delta number 1. Another set of coordinates will be formed for the coordinate system with the origin at the core and the $-x$ axis on delta number 2. These two sets of coordinates will ordinarily be kept together and identified with the same fingerprint. If the pattern has two cores and two deltas, then four such sets of coordinates will be developed. If one of these particular prints should be picked up as a latent print which contained only one of the deltas, the classifier will not be required to indicate which delta is present, which information he may not know.

Fingerprint patterns which have the general classification of arches require some special attention because of the difficulty of locating reference points that are used to form the reference coordinate system. The reference system that will be used for arches is to locate one reference point and determine the range of each of the characteristics in the pattern from the reference point, as explained for standard prints. This reference point will be called the core, even though plain arches do not have a core in the usual sense of the word. The core of plain arches may thus be located in what might be called the center of the pattern. In the case of tent arches, the core is located at the peak of the innermost ridge which curves over the spine of the tent. For other types of arches, there is usually one ridge which has some definite or pronounced upward thrust. If there are more than one location that might be called the core, the classifier will identify each possible core location and the computer will be programmed to construct a coordinate system for each such possible core. In addition, the classifier can indicate the accuracy of the core location in the header 13 of the form and his estimate can be used by the computer to control the searching tolerances. In the classification of arch type prints the classifier will ordinarily not identify the location of the delta.

If either the core or delta is missing the classifier will estimate the location of the missing core, or in the case of the missing delta, the direction of the delta from the core and indicate this estimation in the header 13. The computer will make what calculations it can in the standard way using what information it has been given of the locations estimated by the classifier. The operation where both the core and delta are missing is similar with the classifier estimating the position of the core and the position or direction of the delta.

In the case where the fingerprint may be generally classified more than one way, for example, where a tented arch print may be mistakenly classified as a loop print, this information should be indicated on the header 13 of the form 11 so that the computer will not only file the identification of the print under both classification in the base file but in searching will search both possible files in attempting to make a match.

Possible errors in the classification scheme of the present invention, such as distortion of the pattern or change in the print of an individual with time, can be readily compensated for in a particular print search by indicating the tolerance which should be used by the computer in attempting a match of a search print with a file print.

The present invention therefore provides a method and system of fingerprint classification which has the capability of uniquely identifying a fingerprint based on one finger in a base file of many millions of fingerprints. This method and system are particularly adapted to computer storage and searching whereby the base file of many millions of prints will occupy relatively little space and can be searched by the computer for a match in a very short time to ideally produce and identify from the base file a single fingerprint which matches the fingerprint pattern being searched. In classifying a print, the human tasks are easy and simple and require little experience or judgment on the part of the classifier. With this classification the computer has the capability of searching its base or reference file to identify many separate fingerprint patterns in but a few minutes.

The computer may be programmed according to standard programming techniques to perform the arithmetical, storage, and search-matching operations set forth herein. No specific program has been given herein since the computer program forms no part of the present invention and may be developed by the programmer in accordance with any standard technique which he desires to follow. The invention herein lies in the new and improved method and system of classification of fingerprint patterns by the locations of the core, delta and minute characteristics in a selected coordinate system.

All of the computations, storage and search operations which have been herein allocated to the computer could be accomplished manually but, obviously, only at great sacrifice of time and space. The method and system of classification according to the present invention lends itself to a substantially ideal man-machine relationship in which the man identifies the points of the fingerprint pattern and supplies this information to a computer for processing. The man does those things which he is best capable of doing, such as identifying the characteristics in the pattern area, and the computer does those things which it is most capable of doing, such as performing numerous arithmetic calculations and searching large files. It is indicated that the classifier will only require from 1 to 2 minutes per single fingerprint to fulfill his part of the classification procedure. The time that it takes the computer to search through the reference file to identify an unknown print depends upon the type of storage, the type of file, and the type of computer. If the reference file is on magnetic tape and contains a million fingerprints, then a medium scale computer could identify from 1 to 100 fingerprints in from 6 to 10 minutes. If the reference file is held in a random access storage retrieval device, the search time would be considerably shortened.

While certain preferred methods and systems and means for performing various operations have been specifically described and illustrated, it will be understood that the invention is not limited thereto as many variations may be made therein by those skilled in the art without departing from the scope of the invention which is to be given its broadest interpretations within the terms of the following claims:

I claim:

1. The method of classifying a fingerprint which comprises locating one of the core and delta of the print at a standardized predetermined point in a coordinate system and the other in a standardized direction from said point within said coordinate system; locating the minute characteristics of the print in the coordinate system; determining the system coordinates of the locations of said minute characteristics; and further including: making a reproduction of the fingerprint; mounting said coordinate system on a transparent overlay; placing said overlay over the fingerprint reproduction in accordance with the standardized point and direction of the classification system; directly reading the coordinates of the minute characteristics of the print through the transparent overlay; and manually entering said coordinates into a record.

2. The method of classifying a fingerprint which comprises locating one of the core and delta of the print at a standardized predetermined point in a coordinate system and the other in a standardized direction from said point within said coordinate system; locating the minute characteristics of the print in the coordinate system; determining the system coordinates of the locations of said minute characteristics; and further including: projecting an image of the print upon a form; marking the positions of the core and delta on the form; marking the positions of the minute characteristics of the print on the form; removing the image of the print; scanning the form to determine the coordinates of the marked locations of the core; delta and minute characteristics on another coordinate system; and transferring the coordinates of the locations of the core, delta and minute characteristics of the print from said other coordinate system into the coordinates of the final coordinate system before finally recording said coordinates.

3. The method of fingerprint classification in accordance with claim 2 in which the image of the print is randomly located on the form and within said other coordinate system.

4. The method of fingerprint classification according to claim 2 in which the core is located at the origin of a final Cartesian coordinate system and in which said scanner employs a quadrant of a Cartesian coordinate system as said other coordinate system.

5. The method of fingerprint classification according to claim 2 in which: the location of said core, delta and minute characteristics are manually marked on the form, and in which said locations in the other coordinate system are determined by an optical reader.

References Cited

UNITED STATES PATENTS

| | | | |
|---|---|---|---|
| 1,362,939 | 12/1920 | Harriman | 283—34 |
| 1,206,362 | 11/1916 | Parliman | 283—7 X |
| 1,607,946 | 11/1926 | Crosskey | 283—7 |

LAWRENCE CHARLES, *Primary Examiner.*